(12) United States Patent
Patel et al.

(10) Patent No.: US 7,765,318 B2
(45) Date of Patent: Jul. 27, 2010

(54) WIRELESS DISTRIBUTION & COLLECTION SYSTEM

(75) Inventors: Sanjay H. Patel, Garland, TX (US); Harikrushna S. Patel, Garland, TX (US)

(73) Assignee: Magna Light Corporation, Dallas, TX (US)

(*) Notice: Subject to any disclaimer, the term of this patent is extended or adjusted under 35 U.S.C. 154(b) by 0 days.

(21) Appl. No.: 10/501,653

(22) PCT Filed: Jan. 17, 2003

(86) PCT No.: PCT/US03/01561

§ 371 (c)(1),
(2), (4) Date: Jul. 15, 2004

(87) PCT Pub. No.: WO03/063010

PCT Pub. Date: Jul. 31, 2003

(65) Prior Publication Data

US 2004/0267896 A1     Dec. 30, 2004

Related U.S. Application Data

(60) Provisional application No. 60/349,315, filed on Jan. 18, 2002, now abandoned.

(51) Int. Cl.
*G06F 15/16* (2006.01)
*G06F 15/173* (2006.01)

(52) U.S. Cl. ........................ 709/233; 709/238

(58) Field of Classification Search ................ 709/204, 709/225, 235, 233, 238; 455/16; 370/320, 370/235, 237
See application file for complete search history.

(56) References Cited

U.S. PATENT DOCUMENTS 4,616,108 A     10/1986    Yamaguchi et al.

(Continued)

FOREIGN PATENT DOCUMENTS

GB     2306082 A     4/1997

(Continued)

OTHER PUBLICATIONS

Kellerer W et al.; "IP based enhanced data casting services over radio broadcast networks"; Universal Multiservice Networks, 2000. ECUMN 2000. 1st European Conference on Oct. 2-4, 2000, Piscataway, NJ, USA, IEEE, Oct. 2, 2000, pp. 195-203, XP010520270, ISBN: 978-0-7803-6419.

*Primary Examiner*—Hussein A. Elchanti
(74) *Attorney, Agent, or Firm*—David W. Carstens; Carstens & Cahoon, LLP (57) ABSTRACT

A system for data transmission and reception is provided. The system includes a wireless data broadcast system (100) broadcasting outgoing data from a data network to a plurality of users (126, 128) using one or more wireless broadcast repeaters. A wireless data return path system receives incoming data from the plurality of users and provides the incoming data to the data network. The wireless data return path system further comprises one or more wireless collector system (120) receiving data from a predetermined set of the plurality of users, and one or more return path repeater systems receiving data from one or more predetermined wireless collector systems. The system also uses terrestrial line-of-sight broadcasting in conjunction with satellite data transmission systems.

11 Claims, 6 Drawing Sheets

U.S. PATENT DOCUMENTS

| | | | |
|---|---|---|---|
| 5,592,470 A * | 1/1997 | Rudrapatna et al. | 370/320 |
| 5,864,579 A * | 1/1999 | Briskman | 375/130 |
| 5,884,142 A * | 3/1999 | Wiedeman et al. | 455/12.1 |
| 5,890,055 A * | 3/1999 | Chu et al. | 455/16 |
| 6,115,750 A | 9/2000 | Dillon et al. | |
| 6,438,592 B1 | 8/2002 | Killian | |
| 6,525,691 B2 | 2/2003 | Varadan et al. | |
| 6,810,413 B1 | 10/2004 | Rajakarunanayake et al. | |
| 6,898,428 B2 * | 5/2005 | Thorburn et al. | 455/427 |
| 2002/0103884 A1 | 8/2002 | Duursma et al. | |
| 2002/0123337 A1 * | 9/2002 | Dharia et al. | 455/423 |
| 2002/0167918 A1 | 11/2002 | Brewer | |
| 2004/0110469 A1 * | 6/2004 | Judd et al. | 455/15 |
| 2007/0255829 A1 * | 11/2007 | Pecus et al. | 709/225 |

FOREIGN PATENT DOCUMENTS

| | | |
|---|---|---|
| GB | 2313981 A | 12/1997 |
| WO | WO 92/00632 A2 | 1/1992 |

* cited by examiner

WIRELESS DISTRIBUTION & COLLECTION SYSTEM

CROSS-REFERENCE TO RELATED APPLICATIONS

The present invention claims priority to U.S. provisional patent application 60/349,315, filed Jan. 18, 2002, and co-pending U.S. patent application Ser. No. 10/056,663, filed Jan. 24, 2002, which also claims priority to U.S. provisional patent applications 60/292,940, filed May 24, 2001, and 60/292,946, filed May 24, 2001, each of which is hereby incorporated by reference in its entirety for all purposes.

FIELD OF THE INVENTION

The present invention pertains to the field of data transmission, and more particularly to a system and method for wireless broadband data transmission.

BACKGROUND OF THE INVENTION

Today, the Internet and the World Wide Web (WWW) are the most dynamic area of growth in the internetworking industry. Relative to computer industry's time line, the Internet has been around for ages, but the privatization of the Internet and the proliferation of the WWW has accelerated growth at a rate greater than even the most optimistic prediction.

The amount of data being transmitted over the Internet is becoming enormous in size and rich in multimedia content. The size of the web pages & offered programs are getting so big that download or display using dial-up connection is not practical, which is the method used by most of the Internet users. People are in need of speed to accomplish their tasks on the Internet in reasonable time. The Internet Industry is always coming up with new ideas and methods to provide high speed Internet Connectivity, some of the methods, which are becoming popular currently are ISDN, DSL, CABLE and last but not least wireless.

Most vendors providing wireless access are using spread spectrum radios for point to point or in some cases point to multipoint. Spread spectrum radios provide the Internet connectivity using a direct connection method. It has a limited number of channels, which can serve a limited number of people, and the speed is divided evenly among the people connected to the radio. That means if the radio is connected to a T1 (1.54 Mbps) Internet connection, then this speed will be divided among the people using it. If we connect the radio to its full capacity (254 users), each customer will get less than dial-up modem speed.

SUMMARY OF THE INVENTION

In accordance with the present invention, a system and method for transmitting and receiving data are provided that overcome known problems with transmitting and receiving data.

In particular, a system and method for transmitting and receiving data are provided that allows high-speed wireless connectivity without the need for channel allocation.

In accordance with an exemplary embodiment of the present invention, a system for data transmission and reception is provided. The system includes a wireless data broadcast system broadcasting outgoing data from a data network to a plurality of users using one or more wireless broadcast repeaters. A wireless data return path system receives incoming data from the plurality of users and provides the incoming data to the data network. The wireless data return path system further comprises one or more wireless collector systems receiving data from a predetermined set of the plurality of users, and one or more return path repeater systems receiving data from one or more predetermined wireless collector systems. The system also uses terrestrial line-of-sight broadcasting in conjunction with satellite data transmission systems.

The present invention provides many important technical advantages. One important technical advantage of the present invention is a system and method for data transmission and reception that uses satellite data transmission systems in a two-way environment to provide a terrestrial data transmission network. The present invention uses collectors and repeaters to allow high-speed uplink in conjunction with the satellite data transmission technology, thus providing a two-way high speed data network that can not otherwise be provided using satellite or cable technology.

Those skilled in the, art will further appreciate the advantages and superior features of the invention together with other important aspects thereof on reading the detailed description that follows in conjunction with the drawings.

DETAILED DESCRIPTION OF THE INVENTION

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

Figure 1:
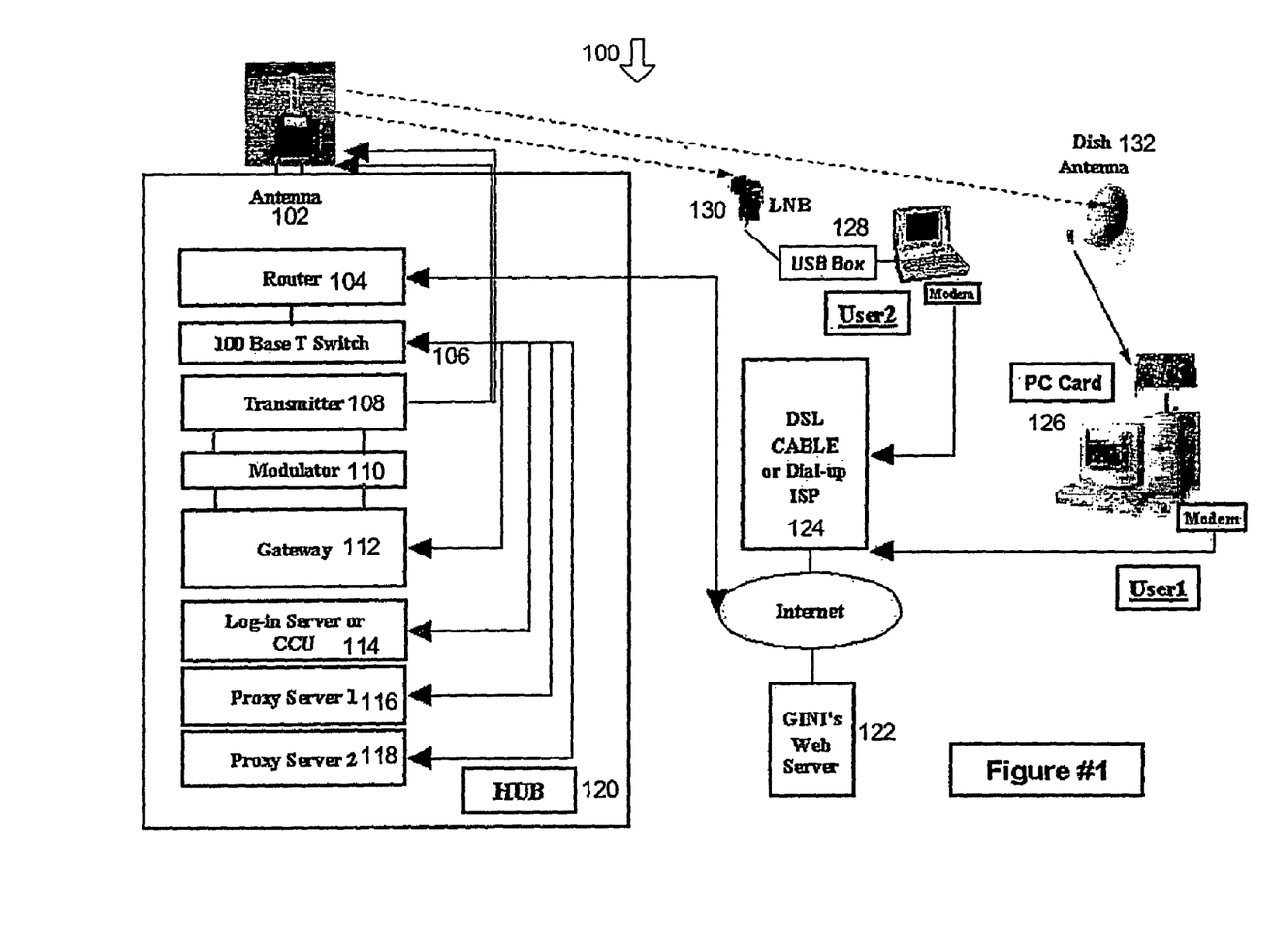
FIG. 1 is a diagram of system for broadcast transmission of data in accordance with an exemplary embodiment of the present invention.

FIG. 1 is a diagram of system 100 for broadcast transmission of data in accordance with an exemplary embodiment of the present invention. In one exemplary embodiment, system 100 can be used for broadcast distribution of data transmitted over the Internet for a plurality of users.

User1 126 or user 2 128 can be personal computers, set-top boxes, or other suitable general or special purpose processing platforms. User 1 126 or User 2 128 can connect to hub 120 using a data transmission protocol such as TCP/IP or other suitable protocol. In one exemplary embodiment, when hub 120 receives a request for information (RFI) from user 1 126, hub 120 retrieves the corresponding information from the Internet, an intranet, or other suitable networks using proxy server 1 116 and proxy server 2 118 or other suitable proxy servers, and broadcasts the retrieved information using gateway 112, modulator 110, transmitter 108 and antenna 102 to user 1 126. User 1 126 can receive the information via dish antenna 132 and associated components, such as a receive card of a general purpose processing platform. The downlink speed can be regulated to equal a suitable speed, such as in excess of 1.54 Mbps, using a regular dialup uplink connection over the public switched telecommunications network (PSTN).

Figure 2:
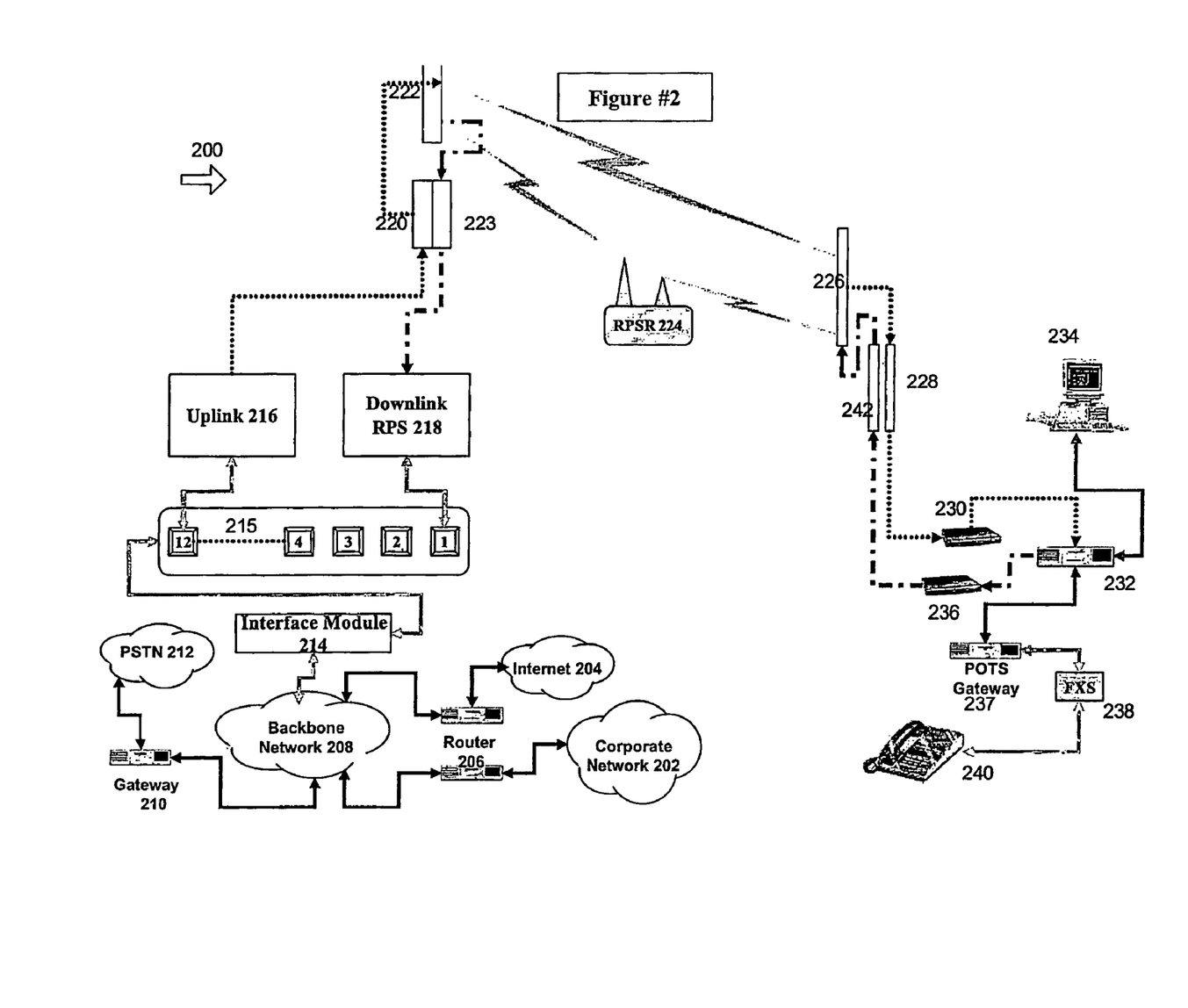
FIG. 2 is a diagram of a system for wireless distribution and collection (WDCS), including one or more exemplary systems and components that can be included within a hub to collect and distribute audio, video and data from the end users, and one or more exemplary systems and components that can be used by an end user to receive and transmit information to a hub using customer premises equipment.

FIG. 2 is a diagram of a system 200 for wireless distribution and collection (WDCS), including one or more exemplary systems and components that can be included within hub 120 to collect and distribute audio, video and data from the end users, and one or more exemplary systems and components that can be used by an end user to receive and transmit information to hub 120 using customer premises equipment.

Interface module 214 provides an exemplary connection to one or more networks and router 215. Interface module 214 can receive and transmit data at a suitable data interface, such as a suitable number of T1, T3, OC3, DS1, DS3, or OC3 data connections, or other suitable data connections. Internal routing can be handled by router 215 at a suitable data processing speed, such as 12.6 gigabits per second (Gbps) or higher. Router 215 can include a suitable number of input-output interfaces, such as 12 as shown, where each provides a predetermined data bandwidth, an equal data bandwidth, or other suitable configurations can be used. In one exemplary embodiment, the front panel of router 215 can provide firewire interfaces, status lighting, switch, speed meter and other information, and the back of router 215 can be used to provide input interface, test ports and management ports. Router 215 can be a special-purpose router that is configured to use a suitable number of data connections independently, such as four T1 data connections, to perform load balancing and/or combine one or more independent data connections into a single data connection. In another exemplary embodiment, each of the input/output ports can be configured to allow users to manage the functions of each port.

Interface Module 214 is connected to corporate network 202 and can be a carrier class module that can accommodate PSTN 212, Internet 204, a frame-relay, an ATM switch, a private network, or other suitable data traffic. As used herein, the term "connect" and its cognate terms such as "connects" and "connected," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are connected to other systems and components through intervening systems and components, such as through an operating system. Router 215 can connect uplink 216 to a suitable port, such as port 12, and downlink 218 to a different suitable port, such as port 1. Uplink 216 is a suitable system that transmits data to end users at high-speed, such as an Internet broadcast system, a satellite system, or a cable system. Satellite systems and cable systems are generally provided for transmit broadcast data to the end users and are not configured to receive data from users, whereas system 200 can be used to transmit and receive data independently or in conjunction with other systems.

Customer premises equipment can include antenna 226, up-converter 242, down-converter 228, modulator 236, demodulator 230, router 232, POTS gateway 237) with Foreign Exchange Station (FXS) interface 238 and FXS telephone 240, general purpose processing platform 234, television signal display systems, or other suitable systems or components.

In one exemplary embodiment, user computer 234 can transmit one or more RFI packets to interface module 214 via router 232, modulator 236, up-converter 242 and antenna 226. Hub 120 receives the RFI packets directly or through return path system repeater 224 via antenna 222, down-converter 223, and after sorting and multiplexing using return path system sorter-multiplexer 218. The data, such as TCP/IP packet data or other suitable data, from return path system sorter-multiplexer 218 is sent to the Internet or other suitable destinations via router 215 and interface module 214.

Router 215 can include a software stack that processes the incoming data to extract destination data, processing control data, or other suitable data, and can perform handshaking and firm link processes between the user and hub 120. Router 215 can route the data to and from Internet 204, PSTN 212, or private networks, or other suitable locations, and can return data from to the users using uplink 216.

When the requested information reaches router 215, the data can be transmitted to the user via uplink 216, up-converter 220, antenna 222, antenna 226 at the users location, down-converter 228, demodulator 230 that can also decode the data to extract TCP/IP packets or data transmitted in accordance with another suitable protocol. Router 232 routes the data to a suitable local destination, such as the end user's computer, telephone or TV.

Figure 3:
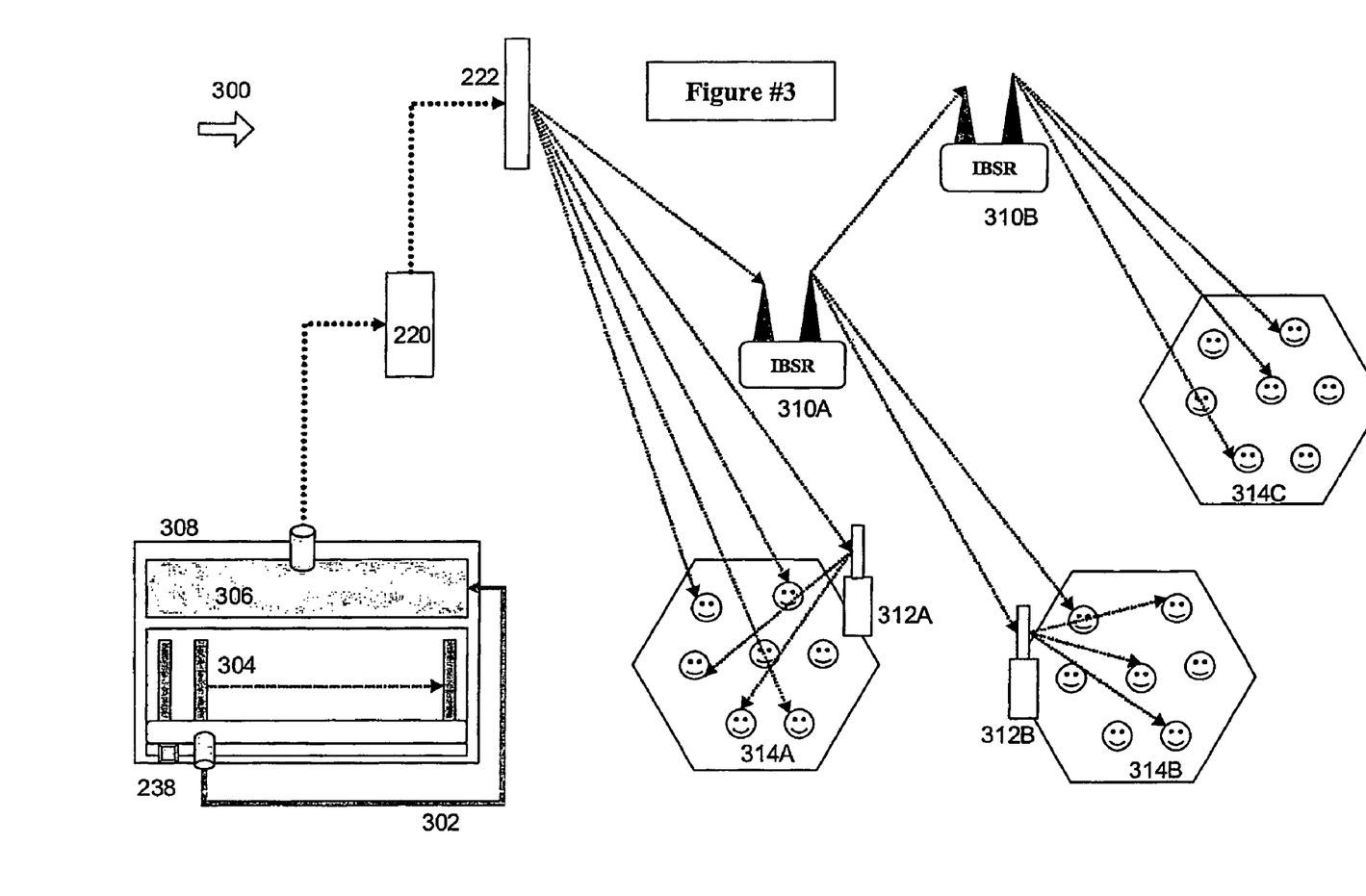
FIG. 3 is a diagram of a system for broadcast repeaters and distributors to provide broadcast data to end users in coverage areas in accordance with an exemplary embodiment of the present invention.

FIG. 3 is a diagram of a system 300 for broadcast repeaters 310A and 310B and distributors 312A and 312B to provide broadcast data to end users in coverage areas 314A, 314B, and 314C, in accordance with an exemplary embodiment of the present invention.

Uplink 216 can transmit data to users via IP data gateway 304, modulator 306, up-converter 220, and Antenna 222. Suitable data compression, modulation and encoding processes, such as MPEG2, MPEG4, DVB and QPSK can be used to compress the data, encode the data for transmission, and to transmit the data over the available frequency spectrum. Up-converter 220 and antenna 222 can operate works at a suitable frequency, such as one between 2.0 to 40.0 GHz. IP data gateway 304 and modulator 306 can be configured to transmit data at a suitable speed based on the transmission frequency, such as 240 Mbps.

End users can receive data directly from antenna 222, as shown in area 314A, or from distributor 312A as shown in area 314A, via broadcast repeater 310A directly or through distributor 312B as shown in area 214B, via broadcast repeater 310A and broadcast repeater 310B as shown in area 314C, or in other suitable manners. System 300 can also allow the user to receive high-speed downloads and use a PSTN dialup connection for uploads, such as for delivering movies on demand, distance-learning class content delivery, delivering media rich content from application service providers, or in other applications where the user does not require a high speed return path.

Figure 4:
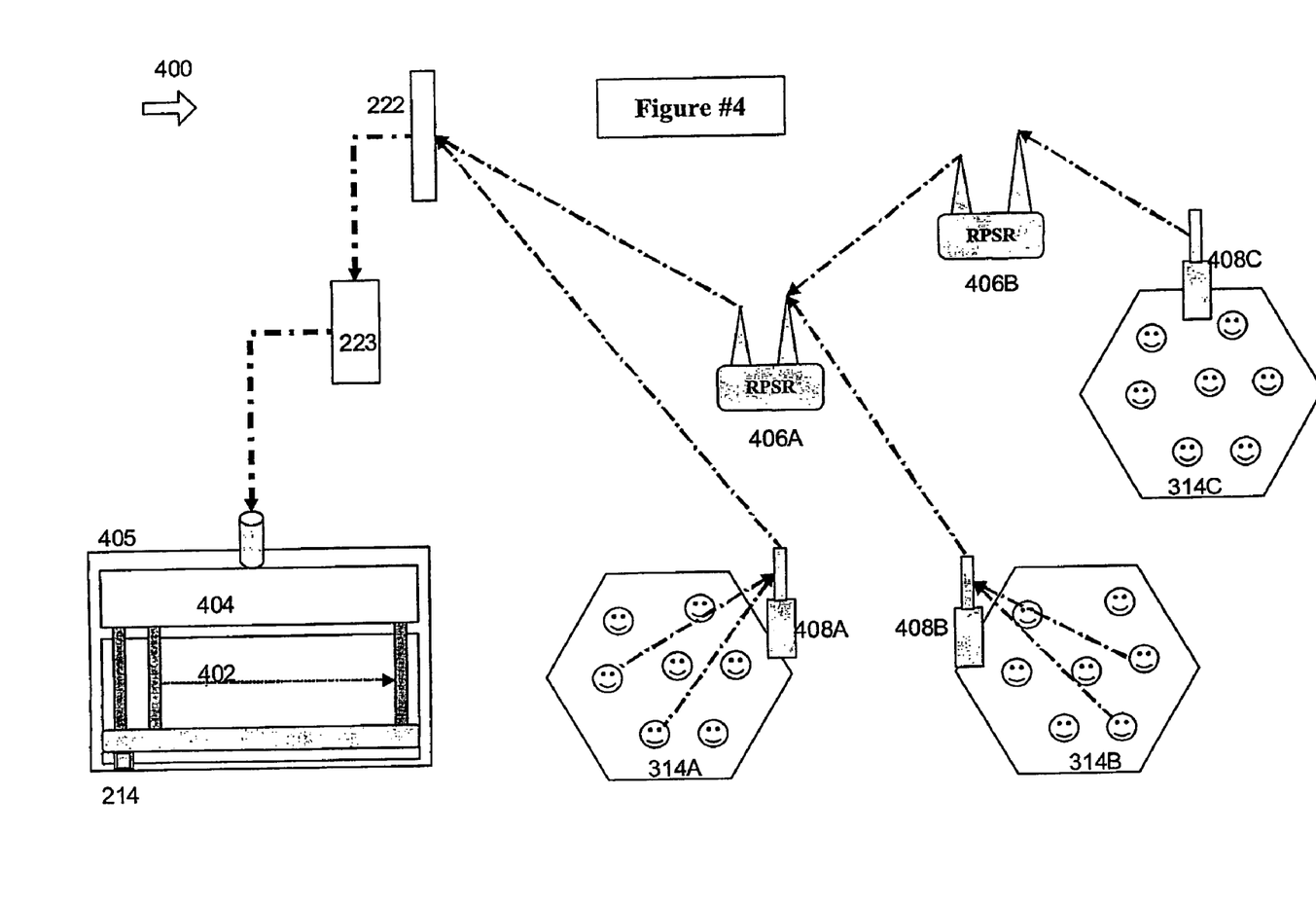
FIG. 4 is a diagram of a system for providing a collection system or return path at high-speed and via wireless link in accordance with an exemplary embodiment of the present invention.

FIG. 4 is a diagram of a system 400 for providing a collection system or return path at high-speed and via wireless link in accordance with an exemplary embodiment of the present invention. Collectors 408A, 408B, and 408C in service area 314A, 314B, and 314C, respectively, collect data from users in their related service areas and send it to hub 120 via antenna 222, return path system repeaters 406A and 406B, or other suitable processes. Hub 120 can receive broadband data, such as millions of packets of data per second, via carrier microwave or other suitable wireless frequencies. The signal is down-converted by down-converter 223 and transmitted to return path system sorter-multiplexer 218, where the data is demodulated and decoded. The extracted data packets can be transmitted over Internet 204, a local area network, or other suitable media.

Figure 5:
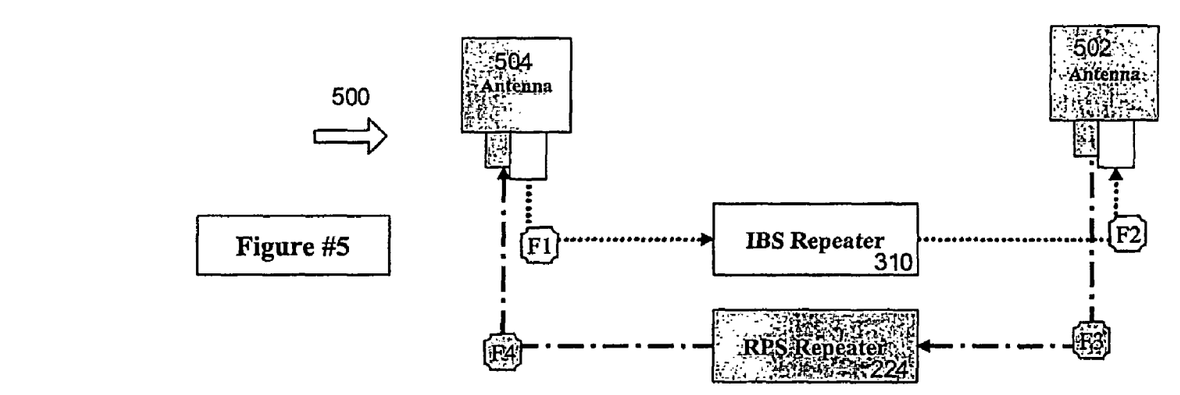
FIG. 5 is a diagram of a system for data repeaters in accordance with an exemplary embodiment of the present invention.

FIG. 5 is a diagram of a system 500 for data repeaters in accordance with an exemplary embodiment of the present invention. Broadcast repeater 310A is a transposer that receives the incoming carrier wave on antenna 504 at frequency F1 and converts the frequency to F2 for transmission to the user or distributor 506 using antenna 502.

Return path system repeater 224 receives the carrier wave at frequency F3 from the end users or from the collectors 508 and converts the frequency to F4 for transmission to hub 120 or another repeater using antenna 504.

Broadcast repeater 310 and return path repeater 224 can be mounted in the same location, such as on a pole or tower, in different locations, or in other suitable configurations. The configuration of the location of broadcast repeater 310 and return path repeater 224 can be selected to fit the distribution of the service area population.

Figure 6:
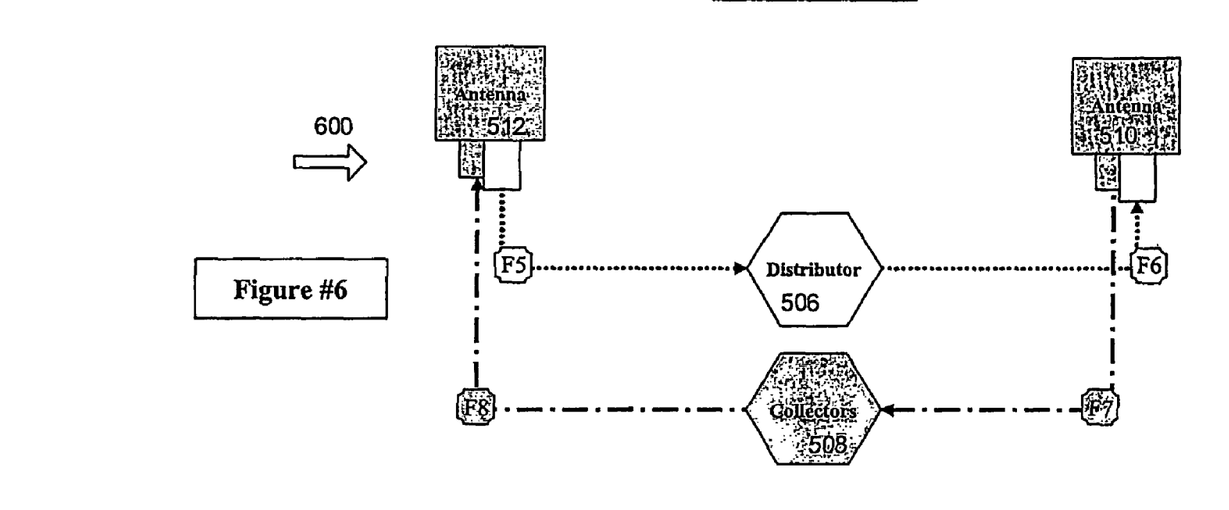
FIG. 6 is a diagram of a system for a distributor and a collector in accordance with an exemplary embodiment of the present invention.

FIG. 6 is a diagram of a system 600 for distributor 506 collector 508 in accordance with an exemplary embodiment of the present invention. Distributor 506 and collector 508 can be mounted in a single housing, separate housing, in the same location to facilitate repair and service, in different locations, or in other suitable manners, and can include low powered frequency transposers. Distributor 506 can receives the carrier wave from hub 120 or broadcast repeater 310 using antenna 512 at frequency F5 and converts the frequency to F6 to transmit it to the users using antenna 510. Collector 508 can receive data from users via antenna 510 at frequency F7 and can convert the signal to frequency F8 for transmission to hub 120, return-path repeater 224, or other suitable systems or components using antenna 512.

In one exemplary embodiment, end users can use either path, such as to receive data over the broadcast channel and to send data over a suitable existing connection. In another exemplary embodiment, a users can transmit data to hub 120 and use an existing cable system, satellite system, or other suitable system to receive data. Likewise, the broadcast and return path of system 100 can be used exclusively, or other suitable embodiments can be used.

System 600 allows outgoing and incoming wireless data transmission to be independently repeated, such as where hub 120 is used to broadcast high-bandwidth content, such as by using DVB/MPEG encoding or other suitable processes, to a distance that can be extended using a broadcast repeater 224. Hub 120 can receive data from users using one or more collectors 508 (at low power) that are located in close proximity to the users and that transmit the data return-path repeaters 224, which in turn send the data to hub 120, allowing the service area for system 100 to be significantly increased over that of other wireless data broadcast systems, such as those that send and receive data from the same radio transceiver and thus cover a limited area A connection to the network, is only needed at hub 120, whereas the prior art requires an Internet connection at each transceiver.

System 600 allows hub 120 to serve a large number of users at speeds that can exceed 1.54 Mbps, based on demand loading, as it is a multicast type system that can deliver content at 100 Mbps or more to a single user, and can receive content at 6 Mbps or more from a single user. A router 215 that works at 12.6 Gbps can be used, and which can be scaled to allow in excess of 50,000 users at a hub 120. Caching of content and providing content directly from hub 120 or on a VPN connection can be used to maximize the Internet bandwidth utilization, as well as other suitable processes. The network can also be used to deliver voice lines using PSTN network and gateways.

Figure 7:
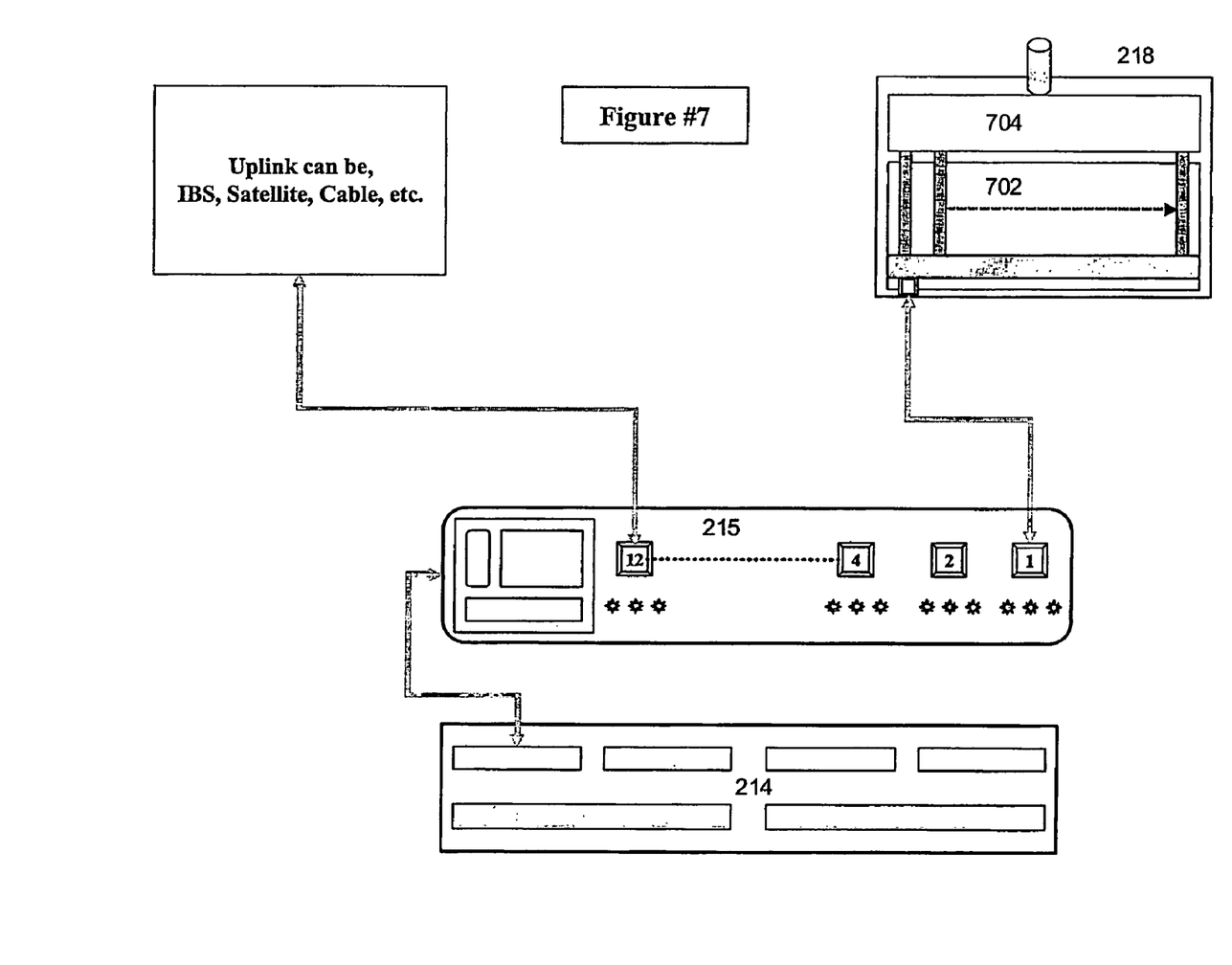
FIG. 7 is a diagram of a system that utilizes an interface module, a router, and a return path system sorter/multiplexer.

FIG. 7 is a diagram of a system 700 that utilizes interface module 214, router 215, and return path system sorter/multiplexer 218. Return path system sorter/multiplexer 218 can accommodate return path data. In one exemplary embodiment, return path system sorter/multiplexer 218 can support 2000 users, such as by utilizing 20 cards 702, each handling incoming high-speed data packets from up to 100 users. Return path system sorter/multiplexer 218 can demodulate and decode the data for each user and assign it to a predetermined time slot. Return path system sorter/multiplexer 218 can operate at clock speeds at or greater than the megahertz range, using a time delay sorting and multiplexing process (TDSM). The current invention utilizes the principle of the mathematics that suggests that two packets cannot arrive at exact same time. This will allow each user to transmit at same frequency such that the configuration of CPE will not be a constraint for hub 120, thus avoiding the constraint of spread spectrum processes that require the transmitter and receiver to be synchronized.

In one exemplary embodiment, a wireless distributor and collection system as described herein can provide wireless microwave links to the users from a central location such as hub 120 that is connected to the Internet, PSTN, private networks, or other suitable data sources. The transmit path to users can utilize satellite data transmission technology in a terrestrial environment (i.e. surface line-of-sight broadcast) to broadcast voice data, video data, packet data, and other suitable data at more than 100 Mbps, such as by using an omnidirectional antenna, towards users in a multicast process. Each user receives, decodes, and demodulate the signal using customer premise equipment (CPE), and can do so at more than 6 Mbps using existing satellite data transmission technology. While the user can use a return path of their choice such as dialup or ISDN, where suitable, return-path repeaters 224 can also transmit data back to hub 120. Hub 120 can be configured to accommodate more than 50,000 users and provide coverage to the area encompassed by more than 50-mile radius using return-path repeaters 224 and distributors 506. Likewise, use of 45 degree, 60 degree, 90 degree, or 180 degree broadcast and receive sectors can provide data throughput of 800, 600, 400, or 200 Mbps per hub 120, respectively.

A return path system includes collectors 508 that can collect data from users and transmit the data to hub 120. The user's CPE can include a modulator, up-converter and antenna to send data to a collector 508 at a low power level approved by FCC. The collector 508 can receive the data at a first frequency and transmit the data to hub 120 or a return path repeater 224 at a second frequency. The collector 508 encompasses a smaller perimeter such as 3 to 5 mile radius and is inexpensive to deploy, and further allows transmission of data to hub 120, which can be located 50 miles or more away from the user, such as by using a suitable number of return path repeaters 224. Each user's modulator can operate at speeds exceeding 10 Mbps using 6 Mhz or smaller bandwidth. Each user can send the signal at the same or different frequencies, and the data can reach hub 120 at the same or different times. A return path system sorter/multiplexer can utilizes time delay multiple access instead of time division multiple access to allow incoming data traffic to be sorted and assigned to a particular time slot for up to 2000 users or more. Hub 120 can be expanded to accommodate a suitable number of users by adding more return path system sorter/multiplexers.

A router that operates on broadcast and return path data can be provided that operates at 12.6 Gbps and allows the broadcast and return paths to work independently or with each other. If the broadcast system is used independently, users can send information using other suitable processes such as dialup or ISDN, and can receive the download at high-speed from the broadcast path. Likewise, the return path can be used independently or in conjunction with the broadcast path.

The system can operate at a suitable frequency, such as between 2 GHz to 40 GHz, so as to be suited for use under the FCC's proposed the super-set HIPERLAN UNII in the 300 Mhz spectrum at 5.15-5.25 Ghz (which can be used for CPE), 5.25-5.35 Ghz (which can be used for collectors/repeaters), and 5.725-5.825 Ghz (which can be used for hubs) with a power of 200 mW, 1 Watt, and 4 Watts, respectively.

Although exemplary embodiments of a system and method of the present invention has been described in detail herein, those skilled in the art will also recognize that various substitutions and modifications can be made to the systems and methods without departing from the scope and spirit of the appended claims.

What is claimed is:

1. A system for data transmission and reception comprising:
   (a) a wireless data broadcast system that broadcasts outgoing data from a data network to a plurality of users, wherein said wireless data broadcast system includes one or more broadcast repeaters that receive data at a first frequency and retransmit said data at a second frequency, and wherein the broadcast repeaters incorporate satellite data transmission technology that includes omnidirectional antennas that transmit data to users at more than 100 Mbps in a terrestrial line-of-sight multicast; and
   (b) a wireless data return path system that receives incoming data from said plurality of users and provides the incoming data to said data network, wherein the wireless data return path system includes:
      one or more wireless collector systems receiving data from a predetermined set of the plurality of users; and
      one or more return path system repeaters that receive data at a third frequency from one or more predetermined wireless collector systems and retransmit said data at a fourth frequency.

2. The system of claim 1 wherein the data network is the Internet.

3. The system of claim 1 wherein at least one of the plurality of users receives the outgoing data from the one or more wireless broadcast repeaters with an antenna.

4. The system of claim 1 wherein the wireless data broadcast system further comprises:
   one or more distributors to distribute the outgoing data from the wireless broadcast repeaters to the plurality of users.

5. The system of claim 4 wherein distributors and collector systems are mounted in the same location.

6. The system of claim 5 wherein the distributors and collector systems are mounted in the same housing.

7. The system of claim 4 wherein distributors and collector systems are mounted in different locations.

8. The system of claim 1 further comprising a hub to retrieve data in response to user requests and broadcast said data from the data network to the one or more wireless broadcast repeaters.

9. The system of claim 8 wherein the hub also receives incoming data from the one or more wireless collector systems.

10. The system of claim 1 wherein broadcast repeaters and return path system repeaters are mounted in the same location.

11. The system of claim 1 wherein broadcast repeaters and return path system repeaters are mounted in different locations.

* * * * *

UNITED STATES PATENT AND TRADEMARK OFFICE
CERTIFICATE OF CORRECTION

PATENT NO. : 7,765,318 B2  
APPLICATION NO. : 10/501653  
DATED : July 27, 2010  
INVENTOR(S) : Sanjay H. Patel et al.

Page 1 of 1

It is certified that error appears in the above-identified patent and that said Letters Patent is hereby corrected as shown below:

On the Title Page
Please add in the "Related U.S. Application Data" Item (60) --Nonprovisional Application No. 10/056,663 filed January 24, 2002, now abandoned.--

Signed and Sealed this
Thirtieth Day of August, 2011

David J. Kappos
*Director of the United States Patent and Trademark Office*

UNITED STATES PATENT AND TRADEMARK OFFICE
CERTIFICATE OF CORRECTION

PATENT NO. : 7,765,318 B2
APPLICATION NO. : 10/501653
DATED : July 27, 2010
INVENTOR(S) : Sanjay H. Patel et al.

It is certified that error appears in the above-identified patent and that said Letters Patent is hereby corrected as shown below:

Column 1, lines 10-12, please delete "which also claims priority to U.S. provisional patent application 60/292,940, filed May 24, 2011, and 60/292,946, filed May 24, 2001,".

Signed and Sealed this
Twenty-fifth Day of October, 2011

David J. Kappos
*Director of the United States Patent and Trademark Office*